(12) United States Patent
Zhou et al.

(10) Patent No.: US 11,054,838 B2
(45) Date of Patent: Jul. 6, 2021

(54) MOBILE ROBOT

(71) Applicant: NEXTVPU (SHANGHAI) CO., LTD., Shanghai (CN)

(72) Inventors: Ji Zhou, Shanghai (CN); Peng Zhang, Shanghai (CN); Xinpeng Feng, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/037,516

(22) Filed: Sep. 29, 2020

(65) Prior Publication Data

US 2021/0141387 A1 May 13, 2021

Related U.S. Application Data

(63) Continuation of application No. PCT/CN2020/109338, filed on Aug. 14, 2020.

(30) Foreign Application Priority Data

Nov. 12, 2019 (CN) .......................... 201921943519.8

(51) Int. Cl.
*G05D 1/02* (2020.01)
*B60K 1/00* (2006.01)

(52) U.S. Cl.
CPC .............. *G05D 1/0251* (2013.01); *B60K 1/00* (2013.01); *G05D 2201/0203* (2013.01)

(58) Field of Classification Search
CPC ................. G05D 1/0251; G05D 1/027; G05D 2201/0203; G01C 21/165; B60K 1/00; B60K 7/00; B60K 2001/001
See application file for complete search history.

(56) References Cited

U.S. PATENT DOCUMENTS

| | | | |
|---|---|---|---|
| 2010/0234993 A1 | 9/2010 | Seelinger et al. | |
| 2016/0147230 A1* | 5/2016 | Munich | G01C 21/206 |
| | | | 701/28 |
| 2016/0166126 A1* | 6/2016 | Morin | A47L 9/2805 |
| | | | 15/319 |
| 2017/0231447 A1 | 8/2017 | Izawa et al. | |
| 2019/0086933 A1 | 3/2019 | Munich et al. | |
| 2019/0220033 A1 | 7/2019 | Cho et al. | |
| 2019/0298134 A1 | 10/2019 | Takaoka et al. | |
| 2020/0337513 A1* | 10/2020 | Johnson | A47L 11/4072 |

FOREIGN PATENT DOCUMENTS

| | | |
|---|---|---|
| CN | 106826749 A | 6/2017 |
| CN | 108247647 A | 7/2018 |
| CN | 108323238 A | 7/2018 |
| CN | 208179600 U | 12/2018 |

(Continued)

*Primary Examiner* — Marthe Y Marc-Coleman
(74) *Attorney, Agent, or Firm* — Seed IP Law Group LLP (57) ABSTRACT

A mobile robot is provided. The mobile robot includes: a driving mechanism configured to drive the mobile robot to move; a chassis on which the driving mechanism is mounted; and a camera mainboard, on which a camera module is provided. The camera module is configured to obtain an external environment image and has at least two optical axes. The camera mainboard is arranged on the chassis such that each of the at least two optical axes is parallel to a horizontal plane.

16 Claims, 3 Drawing Sheets

(56) References Cited

FOREIGN PATENT DOCUMENTS

| | | |
|---|---:|---:|
| CN | 109213137 A | 1/2019 |
| CN | 209063102 U | 7/2019 |
| CN | 110123215 A | 8/2019 |
| CN | 209593641 U | 11/2019 |
| CN | 210998737 U | 7/2020 |
| GB | 2570240 A | 7/2019 |
| JP | 2003280740 A | 10/2003 |
| JP | 2005296510 A | 10/2005 |
| JP | 2009-110250 A | 5/2009 |
| JP | 2011-18150 A | 1/2011 |
| JP | 2015-515922 A | 6/2015 |
| JP | 2018-79170 A | 5/2018 |
| JP | 2018068885 A | 5/2018 |
| JP | 2018153375 A | 10/2018 |
| WO | 2016/027719 A1 | 2/2016 |
| WO | WO 2018/010086 A | 1/2018 |
| WO | WO 2018010096 A1 | 1/2018 |
| WO | WO 2019/007038 A | 1/2019 |

\* cited by examiner

MOBILE ROBOT

CROSS REFERENCE TO RELATED APPLICATION

This application is a Continuation Application of PCT Application No. PCT/CN2020/109338, filed on Aug. 14, 2020, which claims priority to Chinese Patent Application No. 201921943519.8, filed on Nov. 12, 2019, the contents of which are hereby incorporated by reference in their entirety for all purposes.

TECHNICAL FIELD

The present disclosure relates to the field of robots, and more particularly, to a mobile robot.

BACKGROUND

There are technologies for obstacle avoidance and positioning related to mobile robots. In the related art, various types of devices are used to achieve positioning. The various types of devices may be, for example, a compass, an inertial navigation system, a global positioning system (GPS), a wheel odometer, etc. In actual situations, various challenges may be encountered when the above devices are used alone. Visual information has a wide acquisition range and is not subject to sliding of moving wheels, vision-based mobile robots are rapidly developed in recent years. In the related art, the vision-based mobile robot can acquire images of objects external to the mobile robot with a camera.

The method described in this section is not necessarily the method that has been conceived or adopted before. Unless otherwise stated, it should not be assumed that any method described in this section is considered as prior art merely by virtue of its inclusion in this section. Similarly, unless otherwise stated, the problems mentioned in this section should not be considered as recognized in any prior art.

SUMMARY

According to an aspect of the present disclosure, a mobile robot is provided. The mobile robot includes a driving mechanism configured to drive motion of the mobile robot; a chassis on which the driving mechanism is mounted; and a camera mainboard on which a camera module is provided. The camera module is configured to obtain an external environment image and has at least two optical axes. The camera mainboard is arranged on the chassis such that each of the at least two optical axes is parallel to a horizontal plane.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure. The embodiments described herein are for illustrative purposes only, and do not limit the scope of the present disclosure. In the drawings, the same reference numerals refer to similar but not necessarily identical elements.

DETAILED DESCRIPTION

In the present disclosure, unless otherwise stated, terms such as "first" and "second", are used herein for differentiating one element from another element, and are not intended to limit the positional relationship, timing relationship or importance relationship of the elements. In some examples, a first element and a second element may refer to the same instance of the element, and in some cases, the first element and the second element may refer to different instances, based on the contextual description.

The terms used in the description of various embodiments of the present disclosure are for the purpose of describing a particular example only, and are not intended to limit the present disclosure. Unless the context clearly indicates otherwise, if the number of elements is not specifically limited, there may be one or more elements. Moreover, terms such as "and/or" as used herein are intended to cover any and all possible combinations of the listed items.

In the present disclosure, "horizontal plane" refers to a two-dimensional plane on which a mobile robot can move.

In the present disclosure, "feature object" refers to an object associated with performing obstacle avoidance and positioning of the mobile robot.

In the present disclosure, "obstacle avoidance" refers to avoiding obstacles, such as processing and controlling so as not to collide with obstacles.

In the present disclosure, "obstacle object" refers to the feature object that the mobile robot needs to avoid during movement, and "non obstacle object" refers to the feature object that the mobile robot does not need to avoid during movement.

In order to achieve a certain accuracy of positioning, the mobile robot needs to obtain data including depth information of the feature object through multiple images with a certain parallax. It is known that the motion parallax observed by the camera in the field of view may be increased by tilting the camera at an angle above the horizontal plane. Generally, the mobile robot uses the feature object above the horizontal plane as a reference object for positioning. The feature object may be a static feature object at a certain height. In the indoor environment, the feature object may be, for example, a clock, a photo frame, various decorative pieces, wall-mounted air conditioners hung on the wall, or a lighting lamp, a central air conditioner mounted on the ceiling, etc. In other words, in the related art, the optical axis of the camera equipped with the mobile robot is generally arranged obliquely upward. In this case, during the movement of the mobile robot, the camera can only capture the feature object at a higher position (such as on the wall or ceiling), and cannot capture the feature object on the horizontal plane on which the mobile robot moves, such that obstacle avoidance cannot be achieved. In other words, in the related art, the mobile robot cannot perform obstacle avoidance and positioning simultaneously merely through the image captured by the camera. Therefore, in the related art, in order to perform obstacle avoidance during the movement, the mobile robot needs to perceive the feature object on the horizontal plane, such that an additional measurement unit (such as a distance measuring sensor) needs to be installed.

Accordingly, the present disclosure provides a mobile robot. The optical axis of the camera of the mobile robot is arranged in a direction parallel to the horizontal plane, and the mobile robot performs positioning using binocular parallax, without having to perform positioning by increasing the motion parallax observed by the camera in the field of view by tilting the optical axis of the camera.

Unlike the mobile robot in the related art in which the optical axis of the camera is arranged obliquely upward, the optical axis of the camera according to the present disclosure is arranged in the direction parallel to the horizontal plane. The mobile robot according to the present disclosure can thus simultaneously perform obstacle avoidance and positioning by using the image captured by the camera, such that there is no need to install the distance measuring sensor. In some embodiments, since the mobile robot according to the present disclosure may not be equipped with the distance measuring sensor, this reduces the cost of the mobile robot. According to some other embodiments, although obstacle avoidance and positioning are achieved by using the camera, an additional distance measuring sensor may also be arranged. In this case, the camera and the distance measuring sensor can participate in obstacle avoidance of the mobile robot, so as to further improve the accuracy of obstacle avoidance and positioning.

In addition, in the related art, the distance measuring sensor with which the mobile robot is equipped may only measure the distance between the mobile robot and the feature object on the horizontal plane, and cannot determine whether the feature object is an obstacle object or a non obstacle object. The mobile robot according to the present disclosure can obtain the image of the feature object on the horizontal plane through the camera, such that it can further analyze whether the feature object is an obstacle object or a non obstacle object through image processing technology.

Moreover, in the related art, the mobile robot performs positioning using the feature objects above the horizontal plane, the feature objects above the horizontal plane (such as a wall-mounted air conditioner, a lighting lamp, etc.) generally have fixed positions, which makes the mobile robot in the related art less adaptable to the changes in the external environment. The mobile robot according to the present disclosure performs obstacle avoidance and positioning using the feature objects on the horizontal plane. These feature objects on the horizontal plane include objects generally having fixed positions such as beds, sofas, etc., and also include objects whose positions often change such as people, animals, and paper scraps, etc. Thereby, the mobile robot according to the present disclosure is more adaptable to the changes in the external environment compared to the mobile robot in the related art, and has better performance on obstacle avoidance and positioning when the external environment of the mobile robot changes.

The mobile robot according to the present disclosure will be described in detail below with reference to the drawings.

Figure 1:
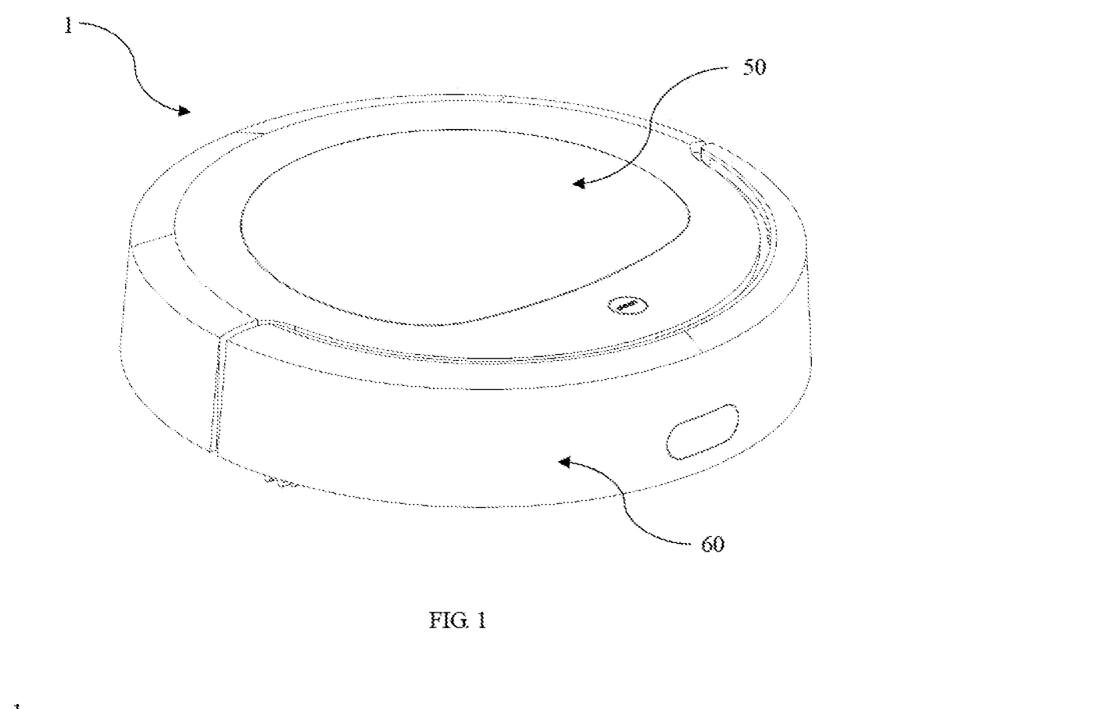
FIG. 1 illustrates a schematic diagram of a mobile robot according to some exemplary embodiments of the present disclosure.
Figure 2:
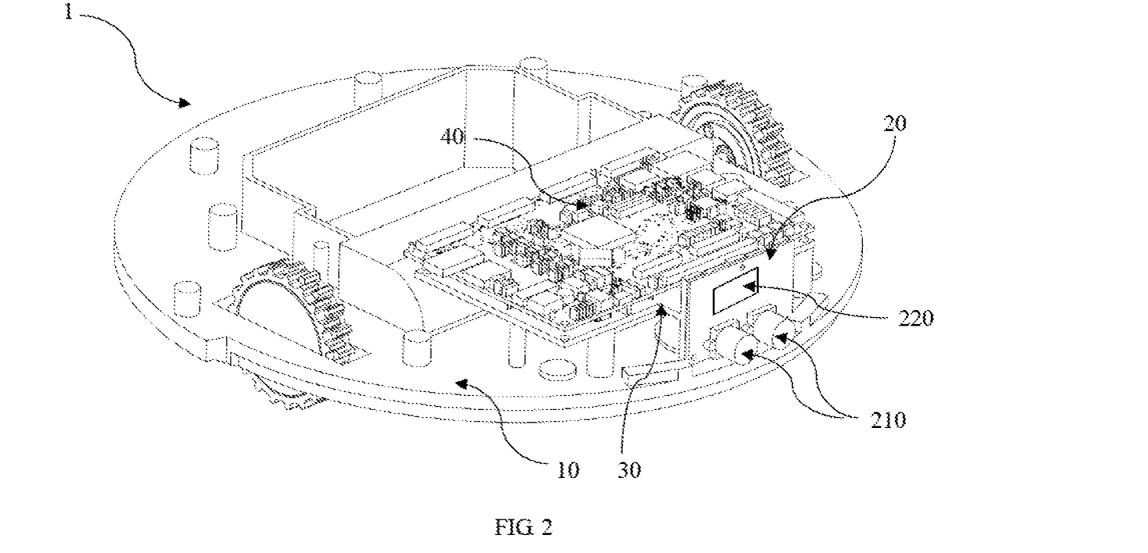
FIG. 2 illustrates a schematic diagram of a mobile robot with a housing removed according to some exemplary embodiments of the present disclosure.

FIG. 1 and FIG. 2 illustrate a mobile robot 1 according to some exemplary embodiments of the present disclosure. In FIG. 2, in order to clearly illustrate the internal components of the mobile robot, the housing 50 of the mobile robot is removed.

The mobile robot 1 according to some exemplary embodiments of the present disclosure may include a driving mechanism (not shown) configured to drive the mobile robot to move; a chassis 10 on which the driving mechanism is mounted; and a camera mainboard 20 on which a camera module 210 is provided. The camera module 210 is configured to obtain an external environment image and has least two optical axes. The camera mainboard 20 is arranged on the chassis 10 such that each of the at least two optical axes is parallel to the horizontal plane. The line connecting the optical axis centers of the at least two optical axes may be parallel to the horizontal plane or perpendicular to the horizontal plane.

Referring to FIG. 1, according to some embodiments, the mobile robot 1 may be any type of mobile robot capable of moving indoors or outdoors, including but not limited to a sweeping mobile robot, a weeding mobile robot, a window cleaning mobile robot, a greeting mobile robot, etc.

According to some embodiments, the mobile robot may include a housing. The housing may be an external housing capable of protecting components of the mobile robot to prevent intrusions such as water, dust, etc. The housing may have any shape, such as a flat cylindrical shape as shown in FIG. 1 or a humanoid shape that simulates a human.

According to some embodiments, the driving mechanism may be any type of mechanism capable of driving the mobile robot to move, for example, to translate or to rotate. For example, the driving mechanism may be a motor. According to some embodiments, the motor or other type of driving mechanism may drive various components of the mobile robot to perform various operations. For example, the motor or other type of driving mechanism may drive the camera to perform telescopic movement or rotational movement.

According to some embodiments, the camera module 210 has at least two optical axes. According to some embodiments, based on each of the at least two optical axes, the corresponding image in the field of view of the camera may be obtained respectively. Since there is a distance between the at least two optical axes, at least two images with binocular parallax between each other may be obtained for the same feature object in the external environment of the mobile robot. The at least two images may be sent to a processor for obstacle avoidance and positioning. The principle of generating binocular parallax using the at least two optical axes is similar to that of using two lenses of a binocular camera.

The camera module 210 may include any type of camera suitable for the mobile robot. According to some embodiments, the camera may be a camera with a wide-angle lens. The camera may include any number of lenses. According to some embodiments, the camera may be at least one of a binocular camera, a multi-view camera, a monocular camera with at least two optical axes, and a monocular camera with at least one optical axis.

According to some embodiments, each of the at least two optical axes of the camera module 210 is parallel to the horizontal plane. The camera having the at least two optical axes parallel to the horizontal plane may obtain optical information of the feature object on the horizontal plane. In other words, the mobile robot may "see" the feature object on the horizontal plane, thereby achieving obstacle avoidance during the movement. According to some embodiments, the camera may have a certain pitch angle of view, such that the feature object on the horizontal plane that the mobile robot can "see" may include not only the feature object that is in direct contact with the horizontal plane, but also other feature objects that are not in direct contact with the horizontal plane but within the angle of view of the camera. In other words, by using the camera with at least two optical axes parallel to the horizontal plane, all the feature objects in the three-dimensional space between the horizontal plane on which the mobile robot moves and the maximum viewing angle plane of the camera may be obtained. The maximum viewing angle plane of the camera may be associated with the maximum angle of view, the maximum viewing distance, the type (binocular or monocular), or number (one or more) of the camera. It should be noted that "each of the at least two optical axes parallel to the horizontal plane" described herein does not mean that the included angle between each of the at least two optical axes and the horizontal plane should be zero. The included angle may also have other angles approximate to zero, and this is generally caused by an inevitable error in the production process of the mobile robot. For example, under normal circumstances, the included angle between each of the at least two optical axes and the horizontal plane is between −5 degrees and +5 degrees.

According to some embodiments, each of the at least two optical axes may be parallel to each other. When each of the at least two optical axes is parallel to each other, at least two images with binocular parallax may be analyzed, and the depth information of the feature object may be calculated according to the principle of similar triangles. According to some embodiments, each of the at least two optical axes may have a preset angle with respect to each other. When each of the at least two optical axes is not parallel to each other, the obtained at least two images may also have an offset of the coordinate system in addition to the binocular parallax. In this case, coordinate transformation may be performed on at least one of the obtained at least two images, such that the transformed coordinate system of the at least one image is unified with the coordinate system of the remaining images, and the depth information of the feature object is calculated based on the binocular parallax between the at least two images of the coordinate system.

A measurement unit 220 together with the camera module 210 may be arranged on the camera mainboard 20. The measurement unit 220 may be at least one of a lidar sensor, an ultrasonic sensor, an infrared sensor, an inertial measurement unit (IMU), a GPS, and a wheel odometer. According to some embodiments, the measurement unit 220 and the camera module 210 may be connected to the same processor.

In some embodiments, the measurement unit 220 may be an IMU. The IMU is a device that measures a three-axis attitude angle (or angular rate) and acceleration of the object, and can be configured to measure the relative motion distance of the object and position the object. The IMU together with the camera module 210 may be arranged on the camera motherboard 20, such that the relative position of the IMU and the camera module 210 remains unchanged, ensuring that the IMU and the camera module move synchronously. The IMU and the camera module 210 may be in the same system time, such that the time stamp of the data obtained by the IMU and the camera module 210 may be calibrated and aligned. Moreover, the calibration method from the coordinate system of the IMU to the coordinate system of the camera module 210 may be susceptible to noise when the relative position of the two changes. By arranging the IMU and the camera module on the same camera mainboard 20, the transformation and calibration between their coordinate systems may be avoided, and thereby reducing the effect of the noise. According to some embodiments, the inertial measurement unit IMU and the camera module 210 may be connected to the same processor.

According to some embodiments, at least one or all of the at least two optical axes of the camera module 210 may be about 3 cm away from the ground. This is to meet the field of view (FOV) requirement of the camera, such that the camera can identify the surrounding environment. Thereby, the camera may not be arranged too high or too low, about 3 cm away from the ground is the best. In other embodiments, the distance between the at least one or all of the at least two optical axes of the camera module 210 and the ground is not limited to 3 cm, and the distance may also be set to other values, as long as the FOV requirement of the camera can be met.

According to some embodiments, the chassis 10 may include a bracket 30 configured to fix the camera mainboard 20. Other components such as a main control chip 40 of the mobile robot may also be arranged on the bracket 30. On the one hand, the bracket 30 plays a role of fixing, such that the camera module 210, the measurement unit 220 and other components on the camera mainboard 20 will not be deformed, and there will be no relative displacement during the movement of the mobile robot. On the other hand, since a lot of heat may be generated during use of the chip (such as the chip of the measurement unit, and the main control chip) and other components, the bracket 30 may be made of materials with sufficient intensity and easy to dissipate heat, such as aluminum alloy profiles, thereby achieving a good heat dissipation effect while the fixing effect is provided.

Figure 3:
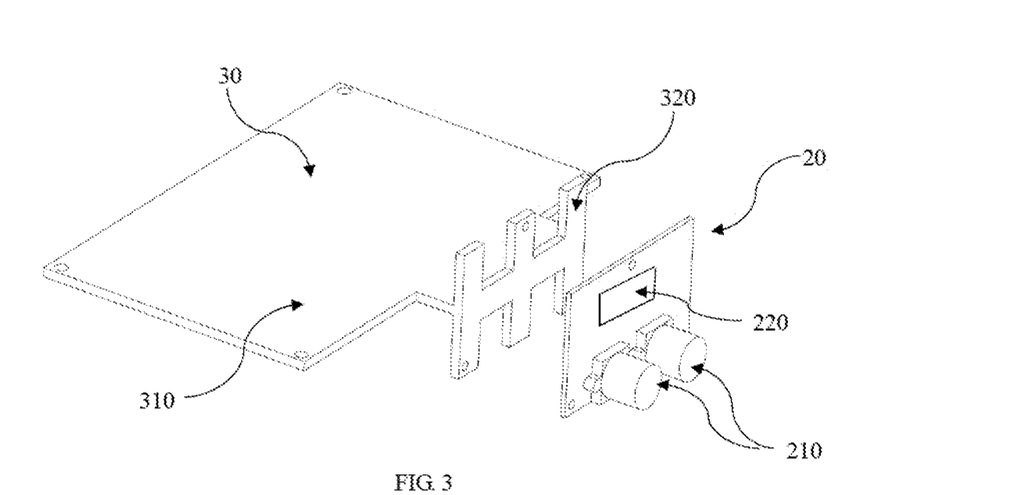
FIG. 3 illustrates a schematic diagram of a bracket for a main control chip and a camera module of a mobile robot according to some exemplary embodiments of the present disclosure.

FIG. 3 schematically illustrates the bracket 30 for the camera module 20 and the main control chip 40 of the mobile robot according to some exemplary embodiments of the present disclosure. The bracket 30 includes a horizontal portion 310 configured to arrange the main control chip 40 and a vertical portion 320 connected with the horizontal portion 310. The camera mainboard 20 is fixed to the vertical portion 320. The vertical portion 320 of the bracket 30 may be in a grid shape to form a heat dissipation grid, thereby further improving the heat dissipation effect. For example, the vertical portion 320 may include multiple vertical bar portions and at least one lateral bar portion, and be connected with the horizontal portion 310 through one of the at least one lateral bar portion. In the embodiment shown in FIG. 2, the vertical portion 320 includes three vertical bar portions and one lateral bar portion, forming a shape similar to " 王 (a Chinese character)" that rotates by 90 degrees.

According to some embodiments, the horizontal portion 310 of the bracket 30 may be integrally formed with the vertical portion 320, for example, manufactured integrally by a numerically-controlled machine.

According to some embodiments, the horizontal portion of the bracket may also be in a grid shape to improve the heat dissipation effect on the main control chip.

According to some embodiments, the camera mainboard 20 may be fixed to the vertical portion 320 of the bracket 30 through a threaded connection, such that the camera mainboard 20 will not be deformed during the process of being fixed to the bracket 30, and there will be no relative displacement between the measurement unit 220 and the camera module 210. For example, in the embodiment shown in FIG. 3, on the vertical portion 320 of the bracket 30, a threaded hole is provided in the lower left corner, the lower right corner, and the upper middle side (i.e., the upper portion of the vertical bar portion in the middle), respectively, and the camera mainboard 20 is fixed to the vertical portion 320 of the bracket 30 by locking screws at the corners or in the middle. On the one hand, the camera mainboard 20 may be reliably fixed. On the other hand, there will no deformation during the process of fixing the camera mainboard 20 to the bracket 30, and the relative position of the measurement unit 220 and the camera module 210 will not be changed.

According to some embodiments, the overall size of the vertical portion of the bracket 30 may be slightly larger than that of the camera mainboard 20, so as to facilitate the fixing of the camera mainboard 20 to the vertical portion of the bracket 30. Certainly, it is also conceivable that the overall size of the horizontal portion of the bracket may be slightly larger than that of the main control chip arranged thereon, so as to facilitate the installation of the main control chip on the horizontal portion of the bracket.

According to some embodiments, the mobile robot 1 may further include an anti-collision mechanism 60 arranged on a circumferential outer side of the housing 50. As shown in FIG. 1, the anti-collision mechanism 60 may be arranged in front of the camera module of the mobile robot 1 to prevent damage to the camera module due to collision.

Figure 4:
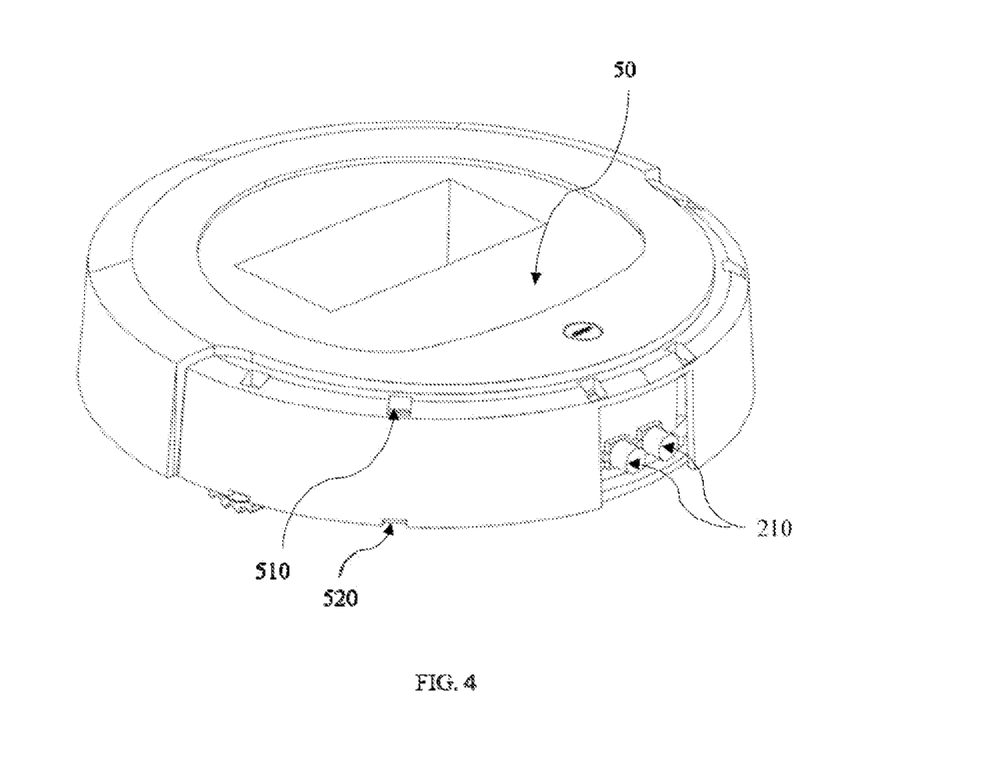
FIG. 4 illustrates a schematic diagram of a mobile robot with an anti-collision mechanism removed according to some exemplary embodiments of the present disclosure.
Figure 5:
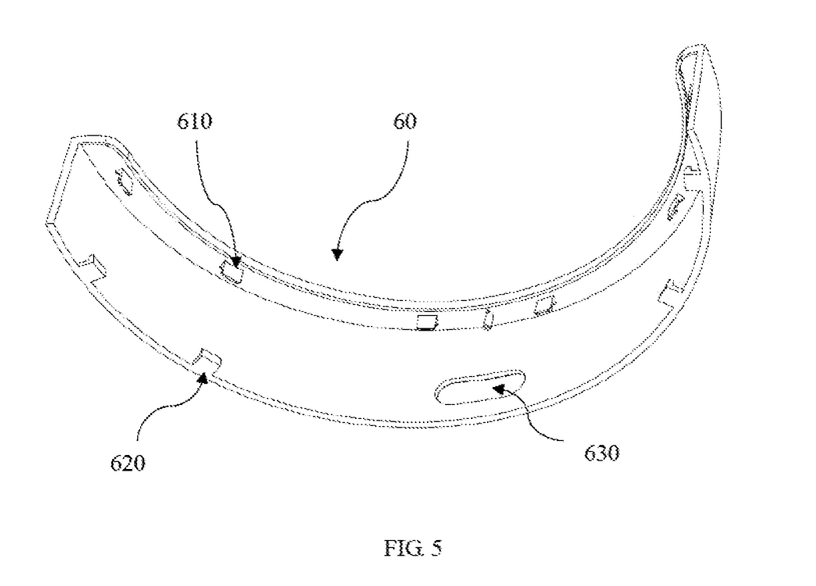
FIG. 5 illustrates a schematic diagram of an anti-collision mechanism of a mobile robot according to some exemplary embodiments of the present disclosure.

FIG. 4 illustrates a mobile robot 1 according to some exemplary embodiments of the present disclosure, and the anti-collision mechanism 60 is removed from the mobile robot 1. FIG. 5 illustrates the anti-collision mechanism 60 of the mobile robot 1 according to some exemplary embodiments of the present disclosure, and FIG. 6 illustrates the housing 50 of the mobile robot 1 according to some exemplary embodiments of the present disclosure.

Figure 6:
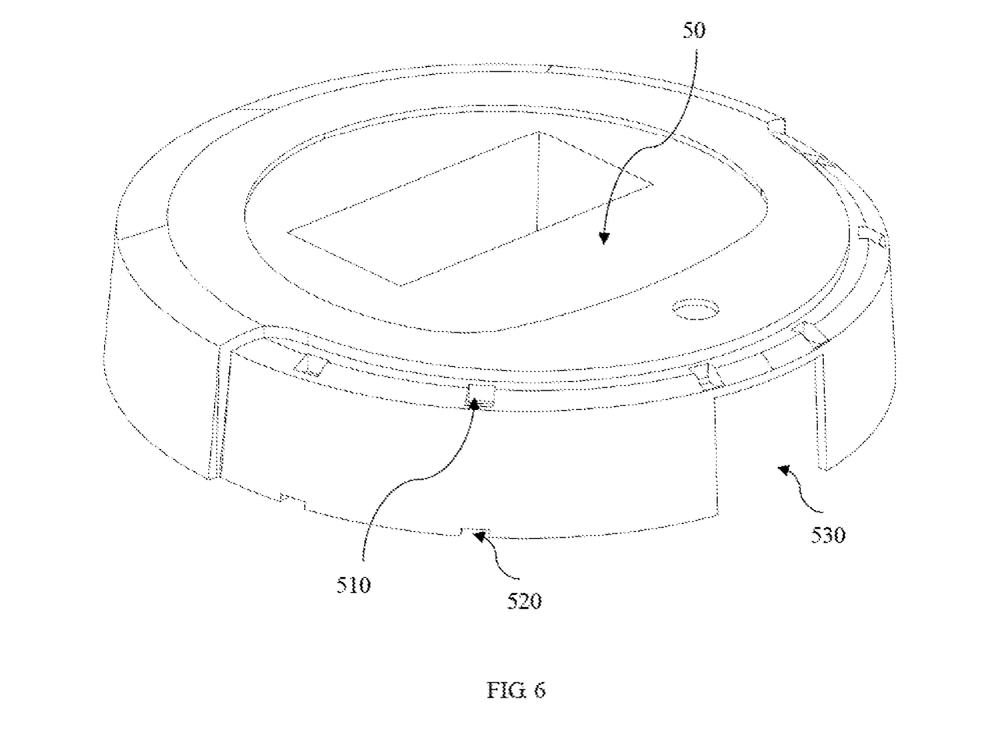
FIG. 6 illustrates a schematic diagram of a housing of a mobile robot according to some exemplary embodiments of the present disclosure.

In the embodiments shown in FIGS. 4 to 6, at least one hook may be arranged on an inner side of the anti-collision mechanism 60, and at least one groove corresponding to the at least one hook is arranged on the housing 50. The at least one hook is engaged in the at least one groove, such that the anti-collision mechanism 60 can move back and forth relative to the housing 50, and there is a gap with the camera module 210 when the anti-collision mechanism 60 moves to a rear limit position.

The anti-collision mechanism 60 may be arranged being protruded from the camera module 210 along a traveling direction of the mobile robot, thereby preventing other objects from directly colliding with the camera module 210 in the process of the mobile robot advancing. In the embodiments shown in FIGS. 4 to 6, the upper shell of the housing 50 is substantially circular, and the anti-collision mechanism 60 is a ring segment covering at least the camera module 210. A plurality of upper hooks 610 are arranged on an upper side of the anti-collision mechanism 60 and a plurality of lower hooks 620 are arranged on a lower side of the anti-collision mechanism 60. Hook bodies of the plurality of upper hooks 610 respectively extend downward along an axial direction and are engaged in the groove 510 arranged in an upper side wall of the housing 50, and hook bodies of the plurality of lower hooks 620 respectively extend inward along a radial direction and are engaged in the groove 520 arranged in a circumferential side wall of the housing 50.

As shown in FIG. 1, after the anti-collision mechanism 60 is mounted on the housing 50, the upper side surface of the anti-collision mechanism 60 and the upper side surface of the housing 50 form a smooth surface, and the circumferential outer side of the anti-collision mechanism 60 and the circumferential outer side of the housing 50 form a smooth surface.

The housing 50 is provided with a recess 530 at a circumferential position corresponding to the camera module 210, and the camera module 210 may protrude from the recess 530. The anti-collision mechanism 60 is provided with a window 630 at a circumferential position corresponding to the recess 530. A transparent lens may be mounted on the window 630 to protect the camera module 210 while not blocking the line sight of the camera module 210. Moreover, the transparent lens can withstand a certain impact force when the mobile robot collides with other objects. For example, the transparent lens may be an acrylic lens. The acrylic material may have good light transmittance and good mechanical property against impact.

An inner edge and/or outer edge of the window 630 is chamfered to avoid blocking the view of the camera module 210.

The followings will help to better understand the aspects of the present disclosure.

Item 1: A mobile robot, comprising:
a driving mechanism configured to drive the mobile robot to move;
a chassis, on which the driving mechanism is mounted; and
a camera mainboard, on which a camera module is provided, and the camera module being configured to obtain an external environment image and having at least two optical axes;
wherein the camera mainboard is arranged on the chassis such that each of the at least two optical axes is parallel to a horizontal plane.

Item 2: The mobile robot of item 1, further comprising a measurement unit arranged on the camera mainboard.

Item 3: The mobile robot of item 1, wherein the camera module is at least one of a binocular module, a multi-view module, and a monocular module with at least two optical axes.

Item 4: The mobile robot of item 1, wherein the chassis comprises a bracket made of a heat-dissipating material, the bracket comprises a horizontal portion configured to arrange a main control chip and a vertical portion connected with the horizontal portion, and the camera mainboard is fixed to the vertical portion.

Item 5: The mobile robot of item 4, wherein the vertical portion is in a grid shape.

Item 6: The mobile robot of item 5, wherein the vertical portion comprises a plurality of vertical bar portions and at least one lateral bar portion, and the vertical portion is connected with the horizontal portion through one of the at least one lateral bar portion.

Item 7: The mobile robot of any one of items 4 to 6, wherein the horizontal portion is in a grid shape.

Item 8: The mobile robot of item 1, wherein the mobile robot further comprises:
a housing; and
an anti-collision mechanism arranged on a circumferential outer side of the housing;
wherein, at least one hook is arranged in an inner side of the anti-collision mechanism, and at least one groove corresponding to the at least one hook is arranged on the housing, and the at least one hook is engaged in the at least one groove, such that the anti-collision mechanism can move back and forth relative to the housing, and there is a gap with the camera module when the anti-collision mechanism moves to a rear limit position.

Item 9: The mobile robot of item 8, wherein the at least one hook comprises a plurality of upper hooks arranged on an upper side of the anti-collision mechanism and a plurality of lower hooks arranged on a lower side of the anti-collision mechanism, wherein hook bodies of the plurality of upper hooks respectively extend downward along an axial direction and are engaged in a groove arranged in an upper side wall of the housing, and hook bodies of the plurality of lower hooks respectively extend inward along a radial direction and are engaged in a groove arranged in a circumferential side wall of the housing.

Item 10: The mobile robot of item 8, wherein the anti-collision mechanism is arranged being protruded from the camera module in a traveling direction of the mobile robot.

Item 11: The mobile robot of item 8, wherein the housing is provided with a recess at a circumferential position corresponding to the camera module, and the anti-collision mechanism is provided with a window at a circumferential position corresponding to the recess, and a transparent lens is mounted on the window.

Item 12: The mobile robot of item 11, wherein an inner edge and/or outer edge of the window is chamfered.

Although some embodiments or examples of the present disclosure are described with reference to the accompanying drawings, it should be understood that the above methods, systems, and devices are merely exemplary embodiments or examples, and the scope of the present disclosure is not limited by these embodiments or examples, but only by the allowed claims and their equivalents. Various elements in the embodiments or examples may be omitted or substituted by equivalent elements thereof. Moreover, the steps may be performed in an order different from that described in the present disclosure. Furthermore, various elements in embodiments or examples may be combined in various ways. It is important that as the technology evolves, many of the elements described herein can be replaced by equivalent elements that appear after the present disclosure.

What is claimed is:

1. A mobile robot, comprising:
   a driving mechanism configured to drive the mobile robot to move;
   a chassis, on which the driving mechanism is mounted; and
   a camera mainboard, on which a camera module is provided, and the camera module being configured to obtain an external environment image and having at least two optical axes,
   wherein the camera mainboard is arranged on the chassis such that each of the at least two optical axes is parallel to a horizontal plane; and
   wherein the chassis comprises a bracket made of a heat-dissipating material, the bracket comprises a horizontal portion configured to arrange a main control chip and a vertical portion connected with the horizontal portion, and the camera mainboard is fixed to the vertical portion.

2. The mobile robot of claim 1, further comprising:
   a measurement unit arranged on the camera mainboard.

3. The mobile robot of claim 1, wherein the camera module is at least one of a binocular module, a multi-view module, and a monocular module with at least two optical axes.

4. The mobile robot of claim 1, wherein the vertical portion is in a grid shape.

5. The mobile robot of claim 4, wherein the vertical portion comprises a plurality of vertical bar portions and at least one lateral bar portion, and the vertical portion is connected with the horizontal portion through one of the at least one lateral bar portion.

6. The mobile robot of claim 1, wherein the horizontal portion is in a grid shape.

7. The mobile robot of claim 1, wherein the mobile robot further comprises:
   a housing; and
   an anti-collision mechanism arranged on a circumferential outer side of the housing,
   wherein at least one hook is arranged in an inner side of the anti-collision mechanism, and at least one groove corresponding to the at least one hook is arranged on the housing, and the at least one hook is engaged in the at least one groove, such that the anti-collision mechanism can move back and forth relative to the housing, and there is a gap with the camera module when the anti-collision mechanism moves to a rear limit position.

8. The mobile robot of claim 7, wherein the at least one hook comprises a plurality of upper hooks arranged on an upper side of the anti-collision mechanism and a plurality of lower hooks arranged on a lower side of the anti-collision mechanism,
   wherein hook bodies of the plurality of upper hooks respectively extend downward along an axial direction and are engaged in a groove arranged in an upper side wall of the housing, and hook bodies of the plurality of lower hooks respectively extend inward along a radial direction and are engaged in a groove arranged in a circumferential side wall of the housing.

9. The mobile robot of claim 7, wherein the anti-collision mechanism protrudes from the camera module in a traveling direction of the mobile robot.

10. The mobile robot of claim 7, wherein the housing includes a recess at a circumferential position corresponding to the camera module, and the anti-collision mechanism includes a window at a circumferential position corresponding to the recess, and a transparent lens is mounted on the window.

11. The mobile robot of claim 10, wherein one or more of an inner edge or an outer edge of the window is chamfered.

12. A mobile robot, comprising:
   a housing;
   an anti-collision mechanism arranged on a circumferential outer side of the housing;
   a driving mechanism configured to drive the mobile robot to move;
   a chassis, on which the driving mechanism is mounted; and
   a camera mainboard, on which a camera module is provided, and the camera module being configured to obtain an external environment image and having at least two optical axes,
   wherein the camera mainboard is arranged on the chassis such that each of the at least two optical axes is parallel to a horizontal plane; and
   wherein at least one hook is arranged in an inner side of the anti-collision mechanism, and at least one groove corresponding to the at least one hook is arranged on the housing, and the at least one hook is engaged in the at least one groove, such that the anti-collision mechanism can move back and forth relative to the housing, and there is a gap with the camera module when the anti-collision mechanism moves to a rear limit position.

13. The mobile robot of claim 12, wherein the at least one hook comprises a plurality of upper hooks arranged on an upper side of the anti-collision mechanism and a plurality of lower hooks arranged on a lower side of the anti-collision mechanism,
   wherein hook bodies of the plurality of upper hooks respectively extend downward along an axial direction and are engaged in a groove arranged in an upper side wall of the housing, and hook bodies of the plurality of lower hooks respectively extend inward along a radial direction and are engaged in a groove arranged in a circumferential side wall of the housing.

14. The mobile robot of claim 12, wherein the anti-collision mechanism protrudes from the camera module in a traveling direction of the mobile robot.

15. The mobile robot of claim 12, wherein the housing includes a recess at a circumferential position corresponding to the camera module, and the anti-collision mechanism includes a window at a circumferential position corresponding to the recess, and a transparent lens is mounted on the window.

16. The mobile robot of claim 15, wherein one or more of an inner edge or an outer edge of the window is chamfered.

* * * * *